US006654167B2

(12) United States Patent
Yamamoto

(10) Patent No.: US 6,654,167 B2
(45) Date of Patent: Nov. 25, 2003

(54) POLARIZATION SCRAMBLER AND MONOCHROMATOR

(75) Inventor: Toshikazu Yamamoto, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/994,169

(22) Filed: Nov. 26, 2001

(65) Prior Publication Data

US 2002/0063959 A1 May 30, 2002

(30) Foreign Application Priority Data

Nov. 27, 2000 (JP) ..................... P2000-360286

(51) Int. Cl.[7] .............. G02B 27/28; G02B 5/30
(52) U.S. Cl. ..................................... 359/484
(58) Field of Search ............... 359/484, 566, 359/246, 850–853

(56) References Cited

U.S. PATENT DOCUMENTS 6,108,120 A * 8/2000 Kawai et al. ............ 359/283

FOREIGN PATENT DOCUMENTS

GB 2143337 * 2/1985

* cited by examiner

Primary Examiner—Mark A. Robinson
Assistant Examiner—Alessandro Amari
(74) Attorney, Agent, or Firm—Fish & Richardson P.C.

(57) ABSTRACT

A polarization scrambler includes a Faraday element in which the thickness of a direction vertical to an optical axis changes continuously, and a magnetic field generator for generating a magnetic field in a direction of the optical axis with respect to the Faraday element.

15 Claims, 7 Drawing Sheets

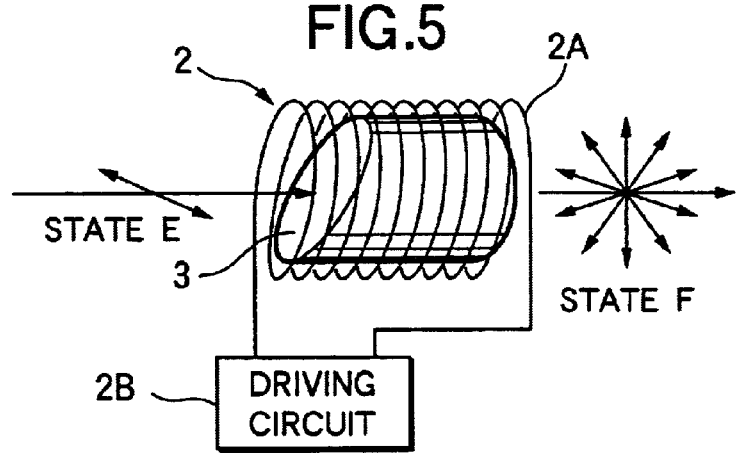
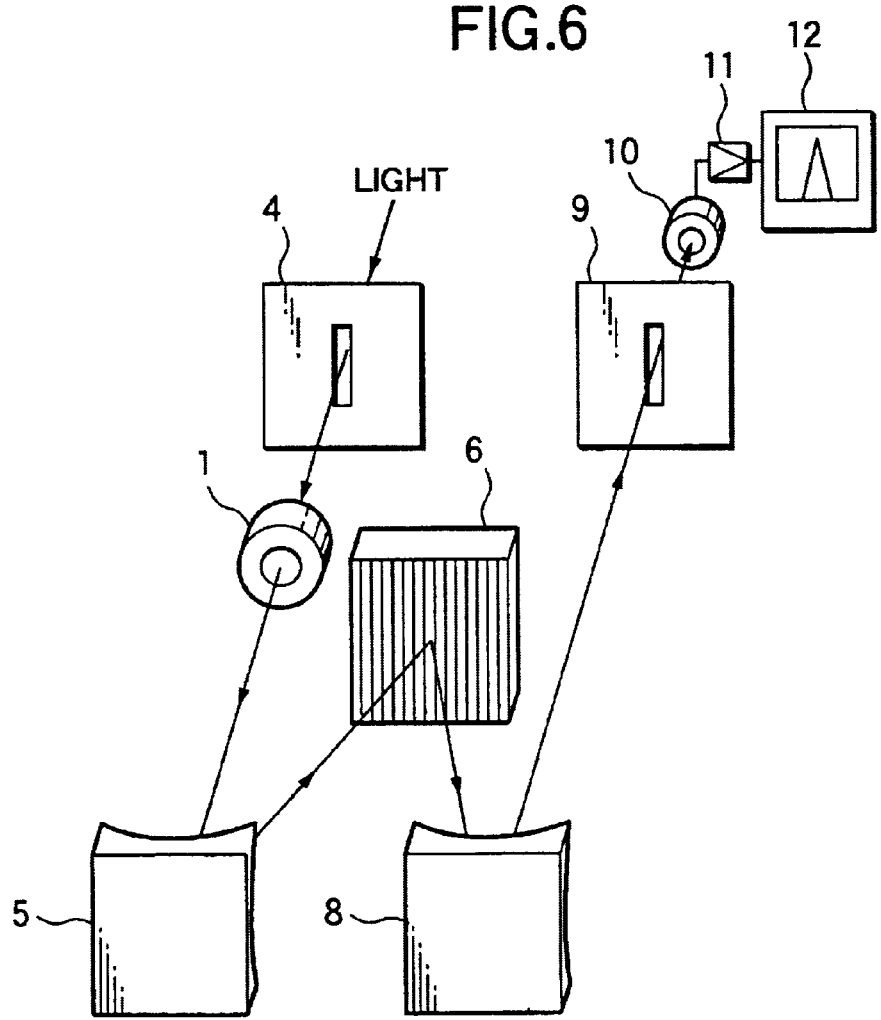

POLARIZATION SCRAMBLER AND MONOCHROMATOR

BACKGROUND OF THE INVENTION

1. Field of the Invention

This invention relates to a polarization scrambler used for eliminating polarization dependence of a monochromator and a monochromator using the polarization scrambler.

2. Description of the Related Art

Generally, a monochromator has polarization dependence and when light such as linearly polarized light biased in a particular direction launches, output characteristics differ depending on a polarization direction are shown even in the light with the same energy. In order to eliminate such polarization dependence, the polarization dependence must be eliminated using a polarization scrambler for converting the incident light having any polarization state into circularly polarized light or non-polarized light.

First, the polarization dependence of the monochromator will be described using a configuration of a conventional monochromator shown in FIG. 12.

A diffraction grating is used in the monochromator. Then, the diffraction grating has a property in which diffraction efficiency depends on a polarization state of incident light. That is, a polarization component vertical to grooves carved on the diffraction grating is different from a polarization component horizontal to the grooves in reflectance. Because of this, in the monochromator using the diffraction grating, the efficiency depends on the polarization state of the incident light and a trouble has been caused in the case of measuring spectral characteristics of the light. As means for solving this problem, a polarization scrambler having a function of converting the incident light into light with a state in which many polarization states are mixed in order to eliminate the polarization dependence of the light incident to the diffraction grating has been used.

Then, in the conventional monochromator, birefringent elements such as quartz or calcite have been used as a polarization scrambler 7.

In FIG. 12, numeral 4 is an incident slit to which light is launched, and numeral 7 is a polarization scrambler, and numeral 6 is a diffraction grating, and numeral 9 is an emission slit, and numeral 5 is a first concave mirror for guiding the light passing through the polarization scrambler 7 to the diffraction grating 6, and numeral 8 is a second concave mirror for guiding the light from the diffraction grating 6 to the emission slit 9.

The polarization scrambler 7 is placed in the back of the incident slit 4 so that an optical axis becomes a direction of 45° with respect to a groove direction of the diffraction grating 6.

Next, an example of a polarization scrambler according to a conventional art will be described using FIG. 7.

In FIG. 7, arrow 71 is an optical axis of a quartz plate 7A and arrow 72 is an optical axis of a quartz plate 7B. The quartz plate 7A has the same shape as that of the quartz plate 7B, and the quartz plate 7A and the quartz plate 7B are bonded together with the optical axis 71 and the optical axis 72 intersecting each other to construct the polarization scrambler 7.

In the quartz plate 7A, the thickness changes continuously along a direction parallel to the optical axis 71 of the quartz plate 7A (in the drawing, the thickness becomes thick in the bottom parallel to the optical axis 71 and becomes thin in the top), and also in the quartz plate 7B, the thickness changes continuously along a direction vertical to the optical axis 72 of the quartz plate 7B (in the drawing, the thickness becomes thick in the top vertical to the optical axis 72 and becomes thin in the bottom).

Next, a function of the polarization scrambler 7 of FIG. 7 will be described by means of FIG. 8.

FIG. 8 is a side view of the polarization scrambler 7.

Quartz constructing the polarization scrambler 7 has an optical axis in a particular direction because of its crystal structure, and has a property of providing a phase difference between a light component of oscillating in parallel to the optical axis and a component of oscillating in vertical to the optical axis of light passing through the quartz.

The phase difference provided here is proportional to a thickness of the quartz. Therefore, since the quartz plate 7A or the quartz plate 7B changes continuously in thickness, the thickness of the quartz differs by places through which the light passes, so that the phase difference provided by the places in which the light passes through the quartz plate differs.

For example, even in case that polarization states before transmission of the light of signs G, H, I of FIG. 8 are same, the phase differences provided by the quartz plate 7A and the quartz plate 7B differ respectively, so that the polarization states of the light after transmission differ respectively (in the quartz plate 7A, a phase of the light of sign I lags behind a phase of the light of sign G and in the quartz plate 7B, a phase of the light of sign G lags behind a phase of the light of sign I).

Therefore, the polarization scrambler 7 can convert the polarization states of the light into a state in which many polarization states are mixed spatially. That is, the polarization states are disturbed spatially.

Incidentally, the polarization scrambler 7 does not have an effect with respect to light components parallel or vertical to the optical axis and these light components are transmitted as it is.

Next, an operation of a monochromator using the polarization scrambler 7 made of the two quartz plates will be described by means of FIG. 12.

In the polarization scrambler 7, incident light passing through the incident slit 4 is converted into a state in which many polarization states are mixed.

Light components parallel or vertical to the optical axis are transmitted as it is, but these components launch at an angle of 45° with respect to grooves of the diffraction grating 6.

Therefore, even in case that the polarization state of the incident light is any state, a ratio between a component vertical to the grooves and a component parallel to the grooves always becomes equal in the incident light to the diffraction grating 6. Hence, efficiency does not vary depending on the polarization state of the incident light, so that a monochromator without polarization dependence can be achieved.

Next, problems of a conventional art will be described by FIG. 11. FIG. 11 is a side view of the polarization scrambler 7 made of the two quartz plates shown in FIG. 7.

Since mutual optical axes of the quartz plate 7A and the quartz plate 7B intersect at right angles, light parallel to the optical axis of the quartz plate 7A becomes light vertical to the optical axis of the quartz plate 7B and light vertical to the optical axis of the quartz plate 7A becomes light parallel of the optical axis of the quartz plate 7B. Therefore, refractive indexes differ in both sides of a slope in which the two quartz plates are bonded together, so that incident light causes refraction in the slope.

Further, a light component parallel to the optical axis 71 of the quartz plate 7A differs from a light component vertical to the optical axis 71 in an angle of refraction in the slope. For example, in incident light N of FIG. 11, a component parallel to the optical axis 71 becomes refracted light O and a component vertical to the optical axis 71 becomes refracted light P.

In this manner, the light is split into two portions along a direction of the slope of the polarization scrambler 7.

Therefore, also in the monochromator as shown in FIG. 12 using the polarization scrambler 7, the light is split in two directions by the polarization scrambler 7 and also a position in which the light is focused on the emission slit 9 is split into two portions.

FIG. 9 is a front view of the emission slit 9 in FIG. 12.

A black dot K of FIG. 9 is a focal position of the case that the polarization scrambler 7 is absent.

Also, black dots J and L are two focal positions of the case that incident light is split in the slope of the polarization scrambler 7 when the polarization scrambler 7 is inserted.

When the polarization scrambler 7 is inserted as shown in FIG. 12, the focal positions on the slit are divided in a slant direction, so that for a narrow width of the slit, all the light cannot pass through the slit 9 even when an angle of the diffraction grating 6 is adjusted. For example, when it is set so as to transmit the light of a focal position J, the light of a focal position L does not pass through the slit 9 and when it is set so as to transmit the light of the focal position L, the light of the focal position J does not pass through the slit 9.

Since an intensity ratio between the light of the focal position J and the light of the focal position L depends on a polarization state, polarization dependence cannot be eliminated when a width of the slit is narrow.

Also, in the case that the diffraction grating 6 is rotated to perform a wavelength sweep, even when the light is, for example, a single wavelength, the light of the focal position J and the light of the focal position L separately pass through the slit, so that there was a problem that two peaks arise in output characteristics of a monochromator with respect to the light with the single wavelength and spectral characteristics of the light cannot be measured correctly.

Also, in the monochromator shown in FIG. 12, when the polarization scrambler 7 is arranged in a direction of 45°, light components parallel or vertical to the optical axis are transmitted as it is and these components launch at an angle of 45° with respect to the grooves of the diffraction grating 6.

Therefore, even in case that the polarization state of the incident light is any state, a ratio between a component vertical to the grooves and a component parallel to the grooves always becomes equal in the incident light to the diffraction grating 6. Hence, efficiency does not vary depending on the polarization state of the incident light, so that a monochromator without polarization dependence can be achieved.

However, in the case of an arrangement deviating from the direction of 45°, for example, an arrangement in a direction of 50°, linearly polarized light incident in the direction of 50° passes without the polarization eliminated, and a ratio between a component vertical to the grooves and a component parallel to the grooves differs. That is, in the case of arranging the polarization scrambler 7 in the direction of 50°, there is a problem that the monochromator has the polarization dependence.

SUMMARY OF THE INVENTION

An object of the invention is to provide a polarization scrambler capable of performing a polarization scramble with respect to any polarization direction without splitting light and irrespective of an arrangement direction of the polarization scrambler, and a monochromator using the polarization scrambler.

In order to achieve the object, a polarization scrambler comprises a Faraday element in which the thickness of a direction vertical to an optical axis changes continuously, and a magnetic field generator for generating a magnetic field in a direction of the optical axis with respect to said Faraday element, and thereby a polarization scrambler capable of performing a polarization scramble with respect to any polarization direction without splitting light and irrespective of an arrangement direction of the polarization scrambler can be obtained.

By forming the magnetic field generator into a cylindrical magnet, a polarization scrambler capable of performing a polarization scramble with respect to any polarization direction in a simple configuration without splitting light and irrespective of an arrangement direction of the polarization scrambler can be obtained.

The magnetic field generator comprises a coil and means for supplying a driving current to said coil, and thereby any current can be passed through the coil.

By forming the driving current to the coil into a current which varies with time (for example, a sine wave, triangular wave or random current), any magnetic field which varies with time can be formed.

By forming the driving current to the coil into a constant current which does not vary with time, a function equivalent to the case of using a permanent magnet can be provided even in the case of using the coil.

By using YIG (yttrium iron garnet) or bismuth substitution garnet as the Faraday element, a polarization scrambler suitable for application can be obtained.

By arranging the polarization scrambler in the front stage of a diffraction grating constructing a monochromator, a monochromator using a polarization scrambler capable of performing a polarization scramble with respect to any polarization direction without splitting light and irrespective of an arrangement direction of the polarization scrambler can be obtained.

Application to various monochromators such as a Czerny-Turner type monochromator or a double path type monochromator as the monochromator can be made.

BRIEF DESCRIPTION OF THE DRAWINGS

FIG. 5 is an operational illustration of the polarization scrambler 2 of FIG. 2.

FIG. 6 is a configuration view of a monochromator using the polarization scrambler 1 of FIG. 1.

DETAILED DESCRIPTION OF THE PRESENT INVENTION

A configuration of a polarization scrambler according to the invention will be described using FIGS. 1, 3A and 3B.

Figure 1:
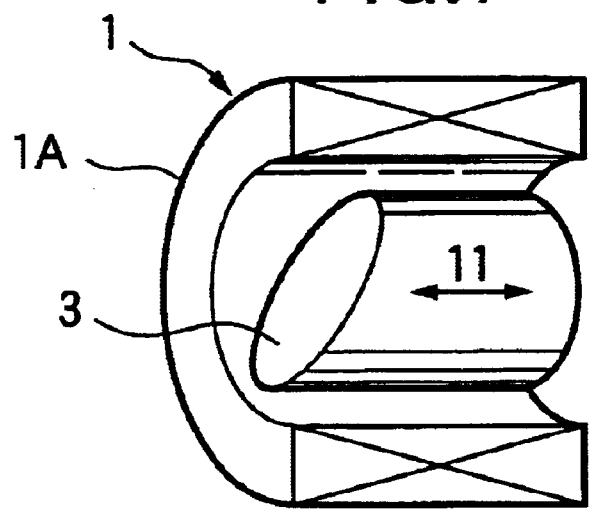
FIG. 1 is a configuration view of a polarization scrambler 1 which is a first embodiment of the invention.

FIG. 1 shows a perspective view of a polarization scrambler which is a first embodiment of the invention.

In FIG. 1, a polarization scrambler 1 comprises a cylindrical Faraday element 3 and a cylindrical magnet 1A arranged so as to surround a circumference of the cylindrical Faraday element 3.

Figure 3A:
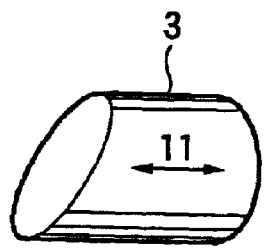
FIGS. 3A and 3B are configuration views of a Faraday element 3 of FIGS. 1 and 2.
Figure 3B:
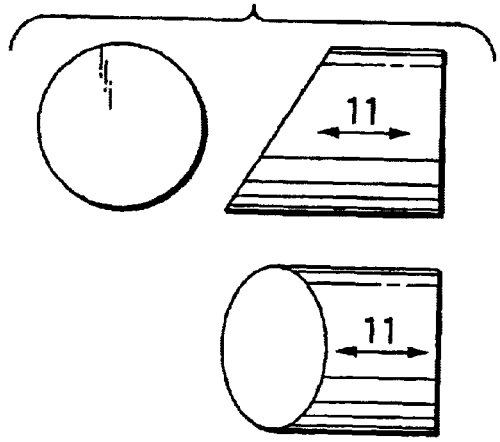

The cylindrical Faraday element 3 is formed into a shape as described in FIGS. 3A and 3B.

FIG. 3A is an outward perspective view of the Faraday element, and FIG. 3B is a front view, a plan view and a side view of the Faraday element.

In FIGS. 3A and 3B, arrow 11 shows an optical axis of the Faraday element.

Next, an operation of the polarization scrambler 1 of the invention will be described using FIG. 4.

In the Faraday element 3, the thickness changes continuously in a direction perpendicular to the optical axis 11 as shown in FIGS. 3A and 3B wherein the Faraday element has a oblique face and a non-oblique face. When the cylindrical magnet 1A is arranged as a magnetic field generator as shown in FIG. 4 so that a magnetic field is applied in a direction of the optical axis 11 of this Faraday element 3, a plane of polarization of the light passing through the Faraday element 3 in the direction of the optical axis 11 rotates in proportion to each of intensity of the applied magnetic field and a thickness of the passed Faraday element by a Faraday effect.

As shown in the drawing, in the Faraday element 3, the thickness changes continuously in the direction perpendicular to the optical axis 11, so that the thickness differs by places through which the incident light C shown in the drawing passes and a rotation angle of a polarization plane provided by the places through which the light passes differs.

Figure 4:
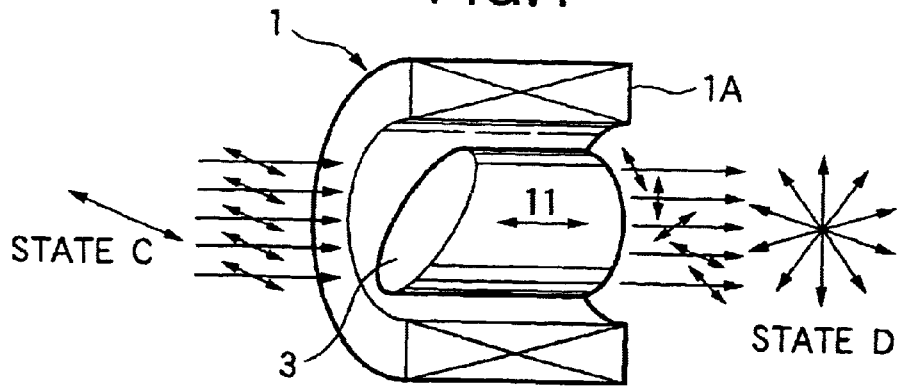
FIG. 4 is an operational illustration of the polarization scrambler 1 of FIG. 1.
Figure 7:
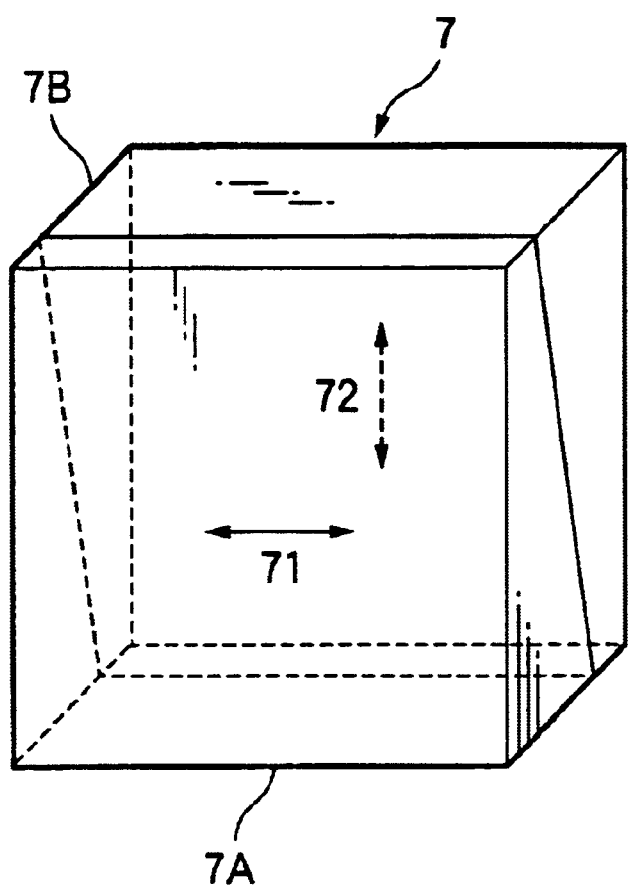
FIG. 7 is a configuration view of a polarization scrambler 7 according to a conventional art.
Figure 8:
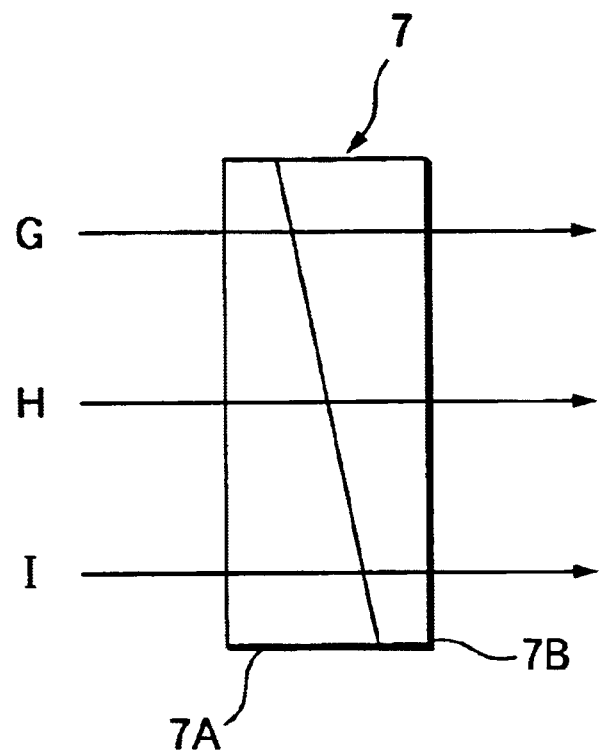
FIG. 8 is a side view of the polarization scrambler 7 of FIG. 7.
Figure 9:
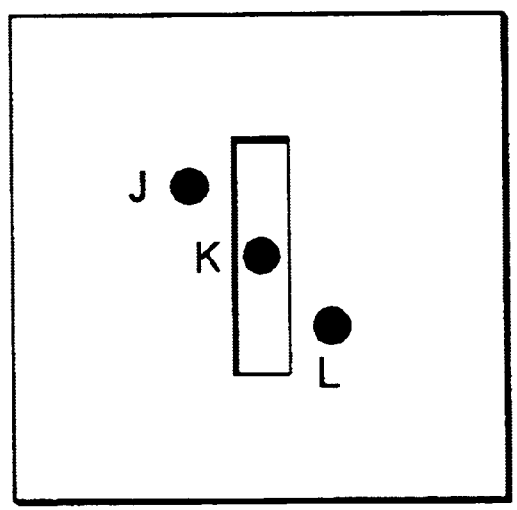
FIG. 9 is a front view of an emission slit 9 of FIG. 12.

The polarization scrambler 1 shown in FIG. 4 can convert a polarization state C of the light into emission light D with a non-polarization state in which many polarization states are mixed spatially.

In the polarization scrambler shown in FIG. 4 using the Faraday element 3, the light is not split into a component parallel to the optical axis and a component vertical to the optical axis unlike a conventional polarization scrambler made of two quartz plates.

When a direction of the incident light is a direction of the optical axis 11 of the Faraday element 3, a polarization scramble can be performed irrespective of a direction of the plane of polarization of the light.

A monochromator using the polarization scrambler 1 of the invention will be described using FIG. 6.

Figure 12:
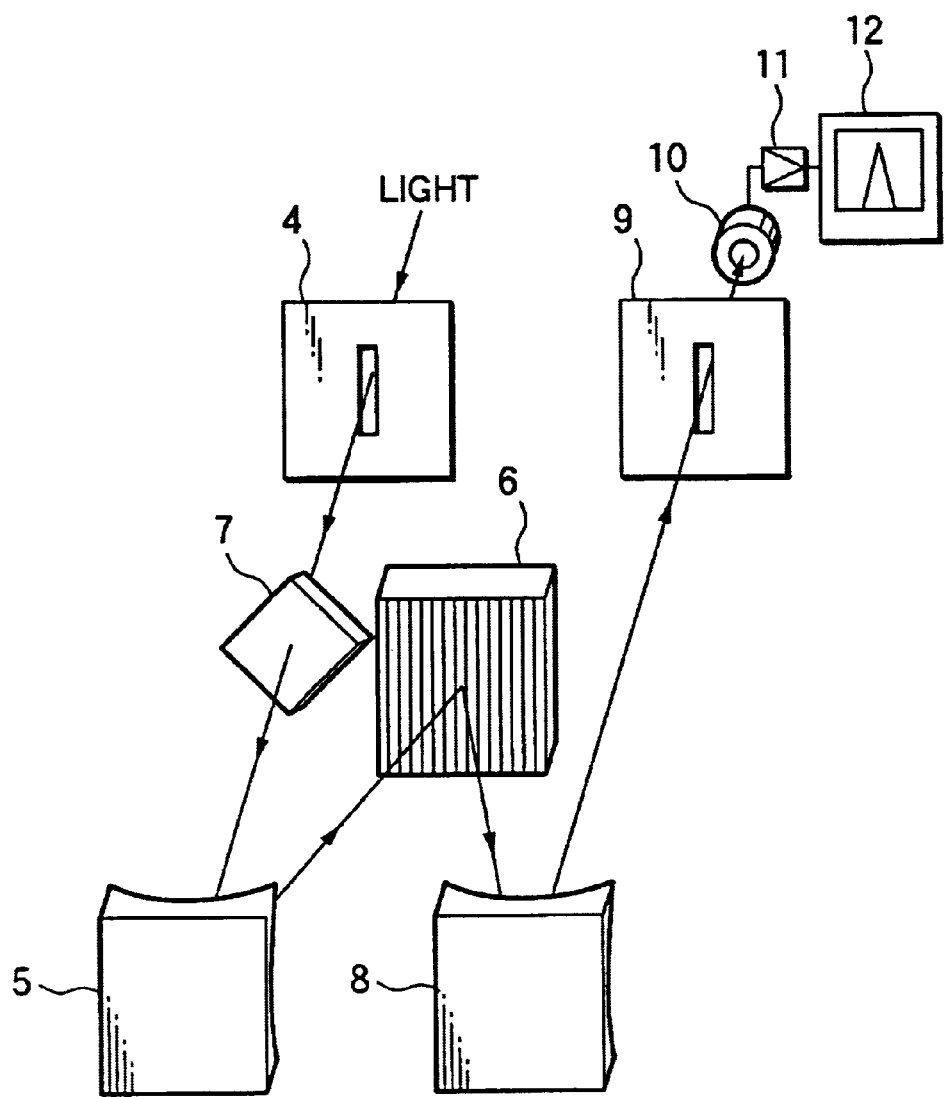
FIG. 12 is a configuration view of a monochromator using the polarization scrambler 7 of FIG. 7.

FIG. 6 is a view showing a configuration of a monochromator using the polarization scrambler 1 of the invention, and FIG. 6 differs from FIG. 12 showing a conventional monochromator in that the conventional polarization scrambler 7 made of two quartz plates is replaced with the polarization scrambler 1 shown in FIG. 4.

Figure 10:
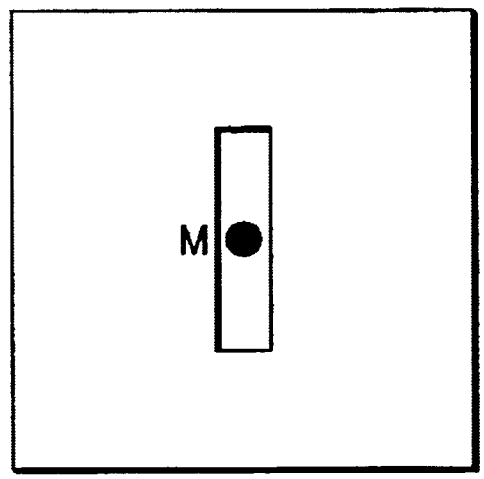
FIG. 10 is a front view of an emission slit 9 of FIG. 6.
Figure 11:
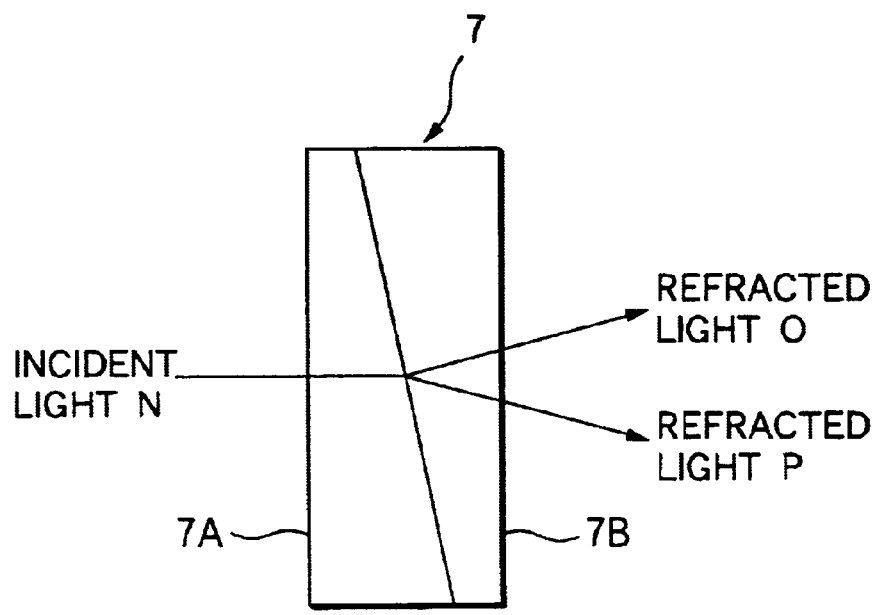
FIG. 11 is a side view of the polarization scrambler 7 of FIG. 7.

In the monochromator shown in FIG. 6, emission light from the polarization scrambler 1 is not split and propagates as one light beam, and a focus on an emission slit 9 is one place of sign M of FIG. 10 and its position is irrelevant to a polarization state.

Since the focus is one place as described above, efficiency does not vary due to the polarization state even when a width of the emission slit 9 is narrow.

When a diffraction grating 6 is rotated to perform a wavelength sweep, the focus on the emission slit is one place, so that two peaks do not arise in output characteristics of the monochromator with respect to the light with a single wavelength and spectral characteristics of the light can be measured correctly.

A configuration of a polarization scrambler 2 which is a second embodiment will be described using FIG. 2.

In the polarization scrambler 2 which is the second embodiment, the cylindrical magnet 1A in the polarization scrambler which is the first embodiment shown in FIG. 1 is replaced with a coil 2A arranged so as to surround a circumference of a cylindrical Faraday element 3 and a driving circuit 2B for driving the coil 2A.

An operation of this polarization scrambler 2 will be described using FIG. 5.

In the polarization scrambler 1 of the first embodiment of FIG. 1, a magnetic field constant with time is applied to the cylindrical magnet 1A, but in the polarization scrambler 2 of this second embodiment, magnetic field intensity occurring in the coil 2A can be changed with time by controlling a current applied to the coil 2A to, for example, a sine wave or a triangular wave or at random through the driving circuit 2B.

By a Faraday effect, a plane of polarization of the light passing through the Faraday element 3 in the direction of an optical axis 11 rotates in proportion to each of intensity of the applied magnetic field and a thickness of the passed Faraday element 3.

A polarization scramble can be implemented with respect to any polarization direction irrespective of an arrangement direction of the polarization scrambler by a synergistic effect of both of the fact that a rotation angle of the plane of polarization of the light can be changed with time by changing the magnetic field intensity with time and the fact that in a manner similar to the polarization scrambler 1 of the first embodiment, since the thickness of the Faraday element 3 changes continuously, the thickness differs by places through which the light passes, so that a rotation angle of a polarization plane provided by the places through which the light passes differs.

A monochromator (not shown) using the polarization scrambler 2 shown in FIG. 2 which is the second embodiment will be described.

Figure 2:
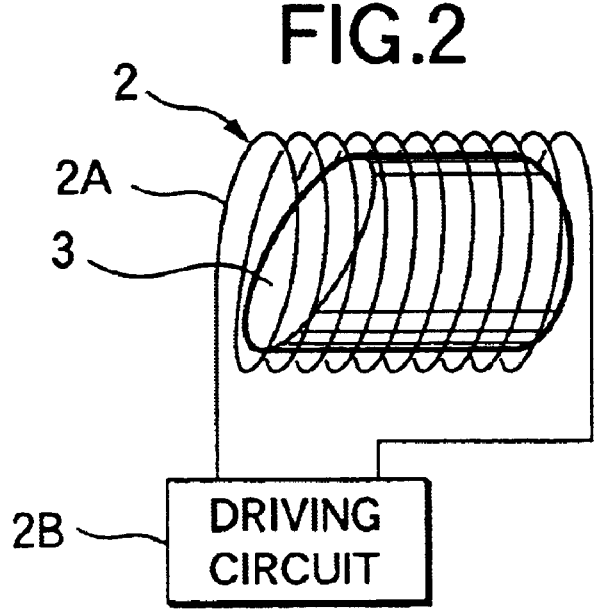
FIG. 2 is a configuration view of a polarization scrambler 2 which is a second embodiment of the invention.

In this monochromator, the polarization scrambler 1 of the monochromator shown in FIG. 6 is replaced with the polarization scrambler 2 shown in FIG. 2 which is the second embodiment.

In this monochromator, the measured light passing through an emission slit 9 is converted into an electrical signal by a light receiving part 10 and passes through a signal processing part 11 to output a result to a spectrum display part 12, and by rotating a plane of polarization at a frequency sufficiently faster than a frequency band of the signal processing part 11, the signal processing part 11 can act as a low-pass filter to output the average value on a time basis. That is, a result in which many polarization states are mixed and there is no polarization dependence can be obtained.

In a manner similar to the polarization scrambler 1, in the polarization scrambler 2, the thickness of the Faraday element 3 changes continuously, so that a rotation angle of a polarization plane provided by the places through which the light passes differs and a conversion into a spatial non-polarization state is also made.

That is, the polarization scrambler 2 can convert a polarization state E of the light into a non-polarization state F in which many polarization states are mixed spatially on a time basis, and a result without polarization dependence further can be obtained.

Efficiency of the monochromator is constant without being influenced by the polarization state of the light and also when a diffraction grating is rotated to perform a wavelength sweep, two peaks do not arise in output characteristics of the monochromator with respect to the light with a single wavelength and spectral characteristics of the light can be measured correctly.

Incidentally, YIG (yttrium iron garnet) or bismuth substitution garnet can be used as the Faraday element used in the first and second embodiments.

Application of the invention is not limited to only a Czerny-Turner type monochromator of FIG. 6. For example, use to various modified type monochromators such as a double path type monochromator can be made.

In the invention, a polarization scrambler comprises a Faraday element in which the thickness of a direction vertical to an optical axis changes continuously, and a magnetic field generator for generating a magnetic field in a direction of the optical axis with respect to said Faraday element, and thereby a polarization scrambler capable of performing a polarization scramble with respect to any polarization direction without splitting light and irrespective of an arrangement direction of the polarization scrambler can be obtained.

In the invention, by forming the magnetic field generator into a cylindrical magnet, a polarization scrambler capable of performing a polarization scramble with respect to any polarization direction in a simple configuration without splitting light and irrespective of an arrangement direction of the polarization scrambler can be obtained.

In the invention, the magnetic field generator comprises a coil and means for supplying a driving current to said coil, and thereby any current can be passed through the coil.

In the invention, by forming the driving current to the coil into a current which varies with time (for example, a sine wave, triangular wave or random current), any magnetic field which varies with time can be formed.

In the invention, by forming the driving current to the coil into a constant current which does not vary with time, a function equivalent to the case of using a permanent magnet can be provided even in the case of using the coil.

In the invention, by using YIG (yttrium iron garnet) or bismuth substitution garnet as the Faraday element, a polarization scrambler suitable for application can be obtained.

In the invention, by arranging the polarization scrambler in the front stage of a diffraction grating constructing a monochromator, a monochromator using a polarization scrambler capable of performing a polarization scramble with respect to any polarization direction without splitting light and irrespective of an arrangement direction of the polarization scrambler can be obtained.

That is, even when a width of an emission slit is narrow, polarization dependence is eliminated and spectral accuracy becomes correct.

Application to various monochromators such as a Czerny-Turner type monochromator or a double path type monochromator as the monochromator can be made.

What is claimed is:

1. A polarization scrambler comprising:
    a Faraday element having a thickness continuously changing in a direction perpendicular to an optical axis, wherein the Faraday element has a oblique face and a non-oblique face; and
    a magnetic field generator for generating a magnetic field in a direction of the optical axis with respect to the Faraday element.

2. The polarization scrambler as defined in claim 1, wherein the magnetic field generator is a cylindrical magnet.

3. The polarization scrambler as defined in claim 1, wherein the magnetic field generator comprises a coil and a driving circuit for supplying a driving current to the coil.

4. The polarization scrambler as defined in claim 3, wherein the driving current to the coil is a current varying with time.

5. The polarization scrambler as defined in claim 3, wherein the driving current to the coil is a constant current not varying with time.

6. The polarization scrambler as defined in claim 1, wherein the Faraday element is YIG (yttrium iron garnet) or bismuth substitution garnet.

7. A monochromator comprising:
    a diffraction grating; and
    a polarization scrambler arranged in the front stage of the diffraction grating, the polarization scrambler including:
        a Faraday element having a thickness continuously changing in a direction perpendicular to an optical axis, wherein the Faraday element has a oblique face and a non-oblique face; and
        a magnetic field generator for generating a magnetic field in a direction of the optical axis with respect to the Faraday element.

8. The monochromator as defined in claim 7, wherein the monochromator is a Czerny-Turner type monochromator or a double path type monochromator.

9. The monochromator as defined in claim 7, wherein the magnetic field generator is a cylindrical magnet.

10. The monochromator as defined in claim 7, wherein the magnetic field generator comprises a coil and a driving circuit for supplying a driving current to the coil.

11. The monochromator as defined in claim 10, wherein the driving current to the coil is a current varying with time.

12. The monochromator as defined in claim 10, wherein the driving current to the coil is a constant current not varying with time.

13. The monochromator as defined in claim 7, wherein the Faraday element is YIG (yttrium iron garnet) or bismuth substitution garnet.

14. The polarization scrambler as defined in claim 1, wherein polarization light is incident at the oblique face and non-polarization light is produced at the non-oblique face, the non-polarization light having one or more polarization states mixed spatially.

15. The monochromator as defined in claim 7, wherein polarization light is incident at the oblique face and non-polarization light is produced at the non-oblique face, the non-polarization light having one or more polarization states mixed spatially.

* * * * *